(12) United States Patent
Sakai et al.

(10) Patent No.: US 10,161,747 B2
(45) Date of Patent: Dec. 25, 2018

(54) SURFACE TEXTURE MEASURING APPARATUS AND METHOD

(71) Applicant: MITUTOYO CORPORATION, Kanagawa (JP)

(72) Inventors: Hiroshi Sakai, Kanagawa (JP); Tetsuya Ito, Kanagawa (JP); Ken Motohashi, Eindhoven (NL)

(73) Assignee: MITUTOYO CORPORATION, Kanagawa (JP)

(*) Notice: Subject to any disclaimer, the term of this patent is extended or adjusted under 35 U.S.C. 154(b) by 158 days.

(21) Appl. No.: 15/430,593

(22) Filed: Feb. 13, 2017

(65) Prior Publication Data
US 2017/0248416 A1    Aug. 31, 2017

(30) Foreign Application Priority Data

Feb. 25, 2016  (JP) .................................. 2016-034437

(51) Int. Cl.
| | |
|---|---|
| *G01B 11/30* | (2006.01) |
| *G01B 11/24* | (2006.01) |
| *G01B 5/00* | (2006.01) |
| *G01B 5/06* | (2006.01) |
| *G01B 5/12* | (2006.01) |

(Continued)

(52) U.S. Cl.
CPC ............ *G01B 11/306* (2013.01); *G01B 5/003* (2013.01); *G01B 5/061* (2013.01); *G01B 5/12* (2013.01); *G01B 11/0608* (2013.01); *G01B 11/12* (2013.01); *G01B 11/2441* (2013.01); *G01B 11/303* (2013.01)

(58) Field of Classification Search
CPC .................................................. G01B 11/306
USPC .......................................................... 356/600
See application file for complete search history.

(56) References Cited

U.S. PATENT DOCUMENTS

| | | | | |
|---|---|---|---|---|
| 2009/0071214 A1* | 3/2009 | Matsuo | ................... | B24C 1/086 72/53 |
| 2011/0083497 A1* | 4/2011 | Matsumiya | ............ | G01B 5/008 73/105 |

FOREIGN PATENT DOCUMENTS

JP         2006-064512 A      3/2006

OTHER PUBLICATIONS

U.S. Appl. No. 15/433,234 to Sadayuki Matsumiya et al., filed Feb. 15, 2017.

* cited by examiner

*Primary Examiner* — Tarifur Chowdhury
*Assistant Examiner* — Omar Nixon
(74) *Attorney, Agent, or Firm* — Greenblum & Bernstein, P.L.C.

(57) ABSTRACT

A surface texture measuring apparatus includes: a measurement sensor measuring, without contact, a surface texture of an interior wall of a cylinder portion of a measurable object while displacing in a normal direction of the interior wall at each measurement region into which the interior wall is divided in a circumferential direction of the cylinder portion; a W axis displacer displacing the measurement sensor in a W axis direction; a θ axis displacer displacing the measurement sensor in the circumferential direction, after measurement of the surface texture of a first measurement region, such that the measurement sensor faces a second measurement region adjacent to the first measurement region in the circumferential direction; and a controller adjusting a W axis direction measurement position for measuring the surface (Continued)

texture of the second measurement region while displacing the measurement sensor in the W axis direction.

11 Claims, 11 Drawing Sheets

(51) Int. Cl.
    *G01B 11/06*     (2006.01)
    *G01B 11/12*     (2006.01)

SURFACE TEXTURE MEASURING APPARATUS AND METHOD

CROSS-REFERENCE TO RELATED APPLICATIONS

The present application claims priority under 35 U.S.C. § 119 of Japanese Application No. 2016-034437, filed on Feb. 25, 2016, the disclosure of which is expressly incorporated by reference herein in its entirety.

BACKGROUND OF THE INVENTION

1. Field of the Invention

The present invention relates to a surface texture measuring apparatus and method measuring a surface texture of an interior wall of a measurable object using a non-contact-type measurement sensor.

2. Description of Related Art

Conventionally, a surface texture measuring apparatus measuring a surface texture of a measurable object has been used. For example, a surface texture measuring apparatus disclosed in Japanese Patent Laid-open Publication No. 2006-064512 detects a change in position of unevenness on a surface of a measurable object to measure an internal diameter and an external diameter of the measurable object.

In recent years, there has been a demand for automatic measurement of a detailed surface texture of an interior wall of a cylinder portion of a measurable object. A method has been proposed in which a measurement sensor measuring the interior wall without contact is rotated within the cylinder portion and the surface texture of the interior wall is measured. However, this measurement method performs measurement on the assumption that the cylinder portion of the measurable object is a perfect circle, but in some cases a real cylinder portion may not be a perfect circle. In such cases, a distance between the measurement sensor and the interior wall is not constant and therefore the interior wall cannot be measured with a high degree of accuracy, as compared to cases where the cylinder portion is a perfect circle.

SUMMARY OF THE INVENTION

In view of these circumstances, the present invention provides a surface texture measuring apparatus capable of measuring a detailed surface texture of an interior wall of a cylinder portion of a measurable object with a high degree of accuracy.

According to one aspect of the present invention, a surface texture measuring apparatus includes a measurement sensor, a normal direction displacement mechanism, a circumferential direction displacement mechanism, and a controller. The measurement sensor measures, without contact, a surface texture of an interior wall of a cylinder portion of a measurable object while displacing in a normal direction of the interior wall at each measurement region into which the interior wall is divided in the circumferential direction of the cylinder portion. The normal direction displacement mechanism displaces, in the normal direction, the measurement sensor measuring the surface texture of a first measurement region. The circumferential direction displacement mechanism displaces the measurement sensor in the circumferential direction, after measurement of the surface texture of the first measurement region, such that the measurement sensor faces a second measurement region adjacent to the first measurement region in the circumferential direction. The controller adjusts a normal direction measurement position for measuring the surface texture of the second measurement region while displacing the measurement sensor in the normal direction, the controller adjusting the measurement position based on measurement results of the surface texture of the first measurement region.

In addition, the measurement sensor may be configured to measure the surface texture in a predetermined measurement range in the normal direction, and the controller may be configured to adjust a normal direction position of the measurement range for measuring the surface texture of the second measurement region based on the measurement results of the surface texture of the first measurement region.

In addition, the controller may be configured to find an estimated distance in the normal direction between a center of rotation of the measurement sensor in the circumferential direction and the first measurement region based on the measurement results of the surface texture of the first measurement region, and may be configured to adjust a normal direction measurement position for measuring the surface texture of the second measurement region based on the estimated distance.

In addition, the measurement sensor may be configured to measure a three-dimensional shape as the surface texture of the first measurement region, and the controller may be configured to find the estimated distance based on the three-dimensional shape of the first measurement region.

In addition, the controller may be configured to find the estimated distance based on one of an average value and a median value of measured values for at least a partial region of the first measurement region.

In addition, the surface texture measuring apparatus may be configured to further include an intersecting direction displacement mechanism displacing the measurable object in a first plane that includes the normal direction and the circumferential direction, in an intersecting direction intersecting with the normal direction and the circumferential direction; and an orthogonal direction displacement mechanism bringing the measurement sensor opposite the interior wall by displacing the measurement sensor in an orthogonal direction orthogonal to the first plane.

In addition, the measurement sensor may be an optical interference sensor measuring the surface texture using data on brightness of interference fringes formed by optical interference.

In addition, the measurement sensor may be an image sensor measuring the surface texture by capturing an image of the interior wall.

In addition, the measurement sensor may be a confocal sensor measuring the surface texture by focusing light on the interior wall.

In addition, the measurement sensor may be a sensor measuring the surface texture by detecting a peak in contrast of a captured image of the interior wall.

According to another aspect of the present invention, a surface texture measuring method includes measuring, without contact, a surface texture of a first measurement region from among a plurality of measurement regions divided in a circumferential direction of a cylinder portion of a measurable object while displacing a measurement sensor in a normal direction of an interior wall of the cylinder portion; displacing the measurement sensor in the circumferential direction, after measurement of the surface texture of the first measurement region, such that the measurement sensor faces a second measurement region adjacent to the first measurement region in the circumferential direction; and adjusting a normal direction measurement position for measuring the surface texture of the second measurement region while displacing the measurement sensor in the normal direction, the adjustment of the measurement position being based on measurement results of the surface texture of the first measurement region.

According to the present invention, a detailed surface texture of an interior wall of a cylinder portion of a measurable object can be measured with a high degree of accuracy.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Configuration of Surface Texture Measuring Apparatus

Figure 1:
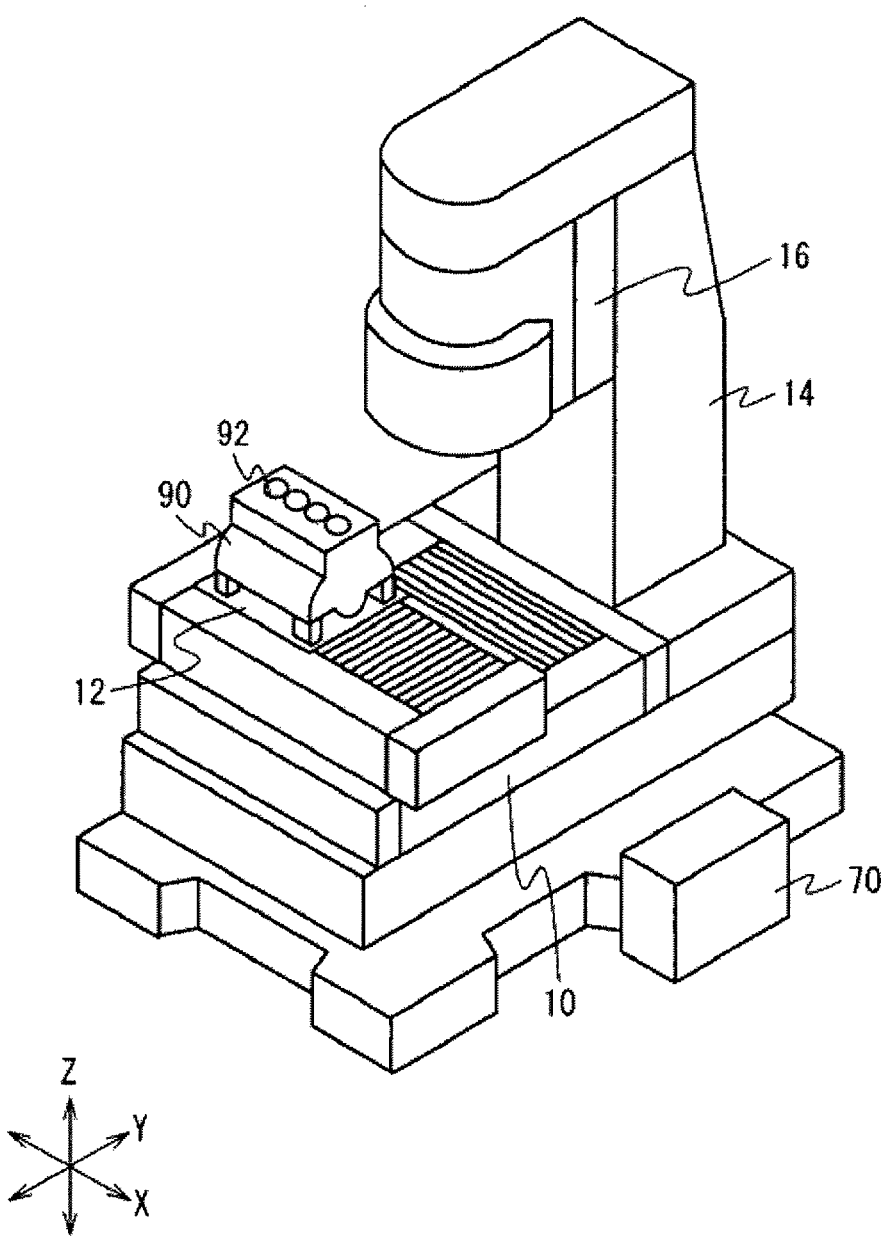
FIG. 1 is a perspective view illustrating an exemplary external configuration of a surface texture measuring apparatus according to an embodiment of the present invention.
Figure 2:
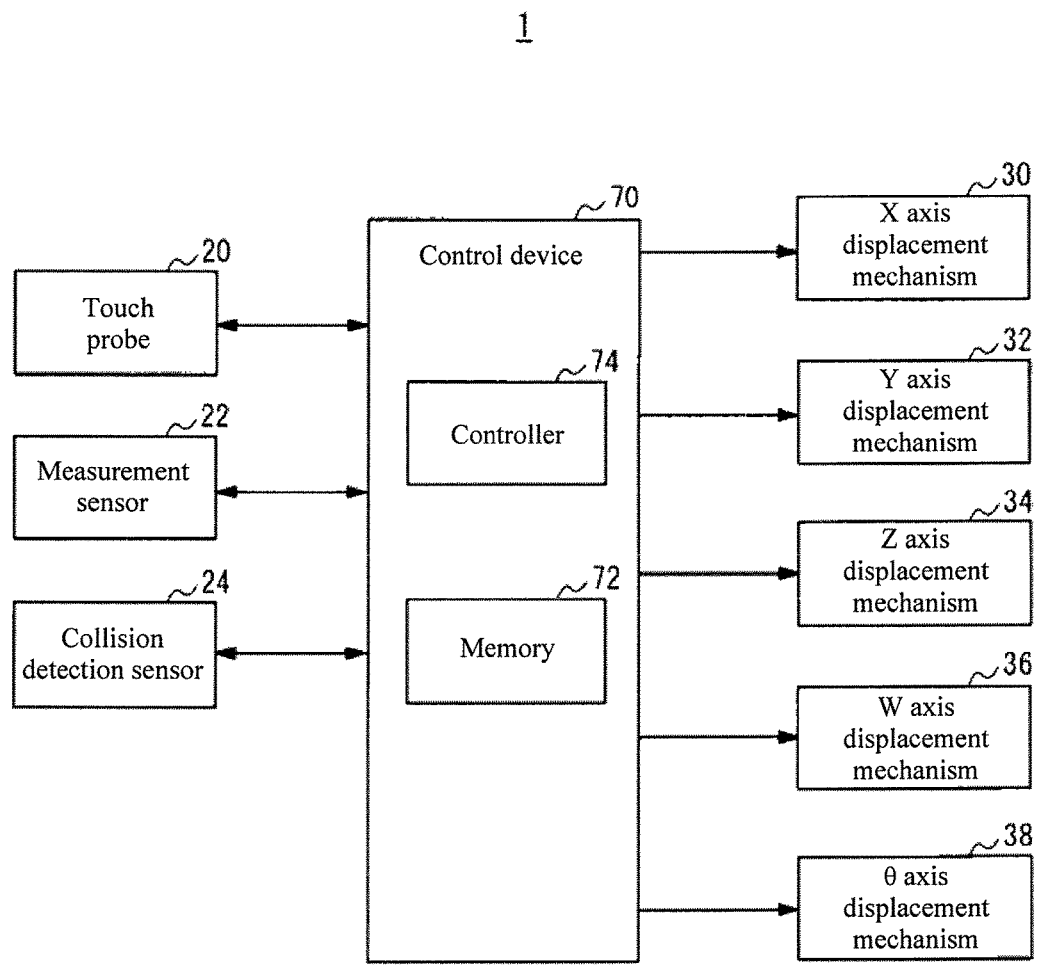
FIG. 2 is a block diagram illustrating a configuration of the surface texture measuring apparatus.

A configuration of a surface texture measuring apparatus 1 according to an embodiment of the present invention is described with reference to FIGS. 1 and 2. FIG. 1 is a perspective view illustrating an exemplary external configuration of the surface texture measuring apparatus 1 according to the present embodiment. FIG. 2 is a block diagram illustrating the configuration of the surface texture measuring apparatus 1.

As shown in FIGS. 1 and 2, the surface texture measuring apparatus 1 includes a table 10, a stage 12, a support column 14, a Z slider 16, a touch probe 20, a measurement sensor 22, a collision detection sensor 24, an X axis displacement mechanism/displacer 30, a Y axis displacement mechanism/displacer 32, a Z axis displacement mechanism/displacer 34, a W axis displacement mechanism/displacer 36, a θ axis displacement mechanism/displacer 38, and a control device 70. In the present embodiment, the W axis displacement mechanism 36 corresponds to a normal direction displacement mechanism/displacer, the θ axis displacement mechanism 38 corresponds to a circumferential direction displacement mechanism/displacer, the X axis displacement mechanism 30 and Y axis displacement mechanism 32 correspond to intersecting direction displacement mechanisms/displacer, and the Z axis displacement mechanism 34 corresponds to an orthogonal direction displacement mechanism/displacer.

The surface texture measuring apparatus 1 is a device automatically measuring a surface texture of an interior wall 92 of a measurable object 90. In the following description, the measurable object 90 is a cylinder head of an engine. The cylinder head has four cylinders (cylinder portions), and the surface texture measuring apparatus 1 measures the surface texture of the interior walls 92 of the four cylinders. The surface texture measuring apparatus 1 is capable of measuring surface texture without disassembling or cutting the measurable object 90.

The table 10 is the base of the surface texture measuring apparatus 1. For example, the table 10 is arranged on an anti-vibration table installed on a shop floor. The anti-vibration table prevents vibrations in the shop floor from being transmitted to the table 10.

The stage 12 is provided on the table 10. The measurable object 90 is placed on the stage 12. The stage 12 is capable of displacement in X and Y axis directions using the X axis displacement mechanism 30 and the Y axis displacement mechanism 32. The measurable object 90 may also be placed on the stage 12 using a dedicated jig. In such a case, the surface texture of the interior wall 92 can be measured for measurable objects 90 having a large number of shapes.

The support column 14 is provided rising along a Z axis direction from a top surface of the table 10. The support column 14 supports the Z slider 16 such that the Z slider 16 is capable of displacement in the Z axis direction.

Figure 3:
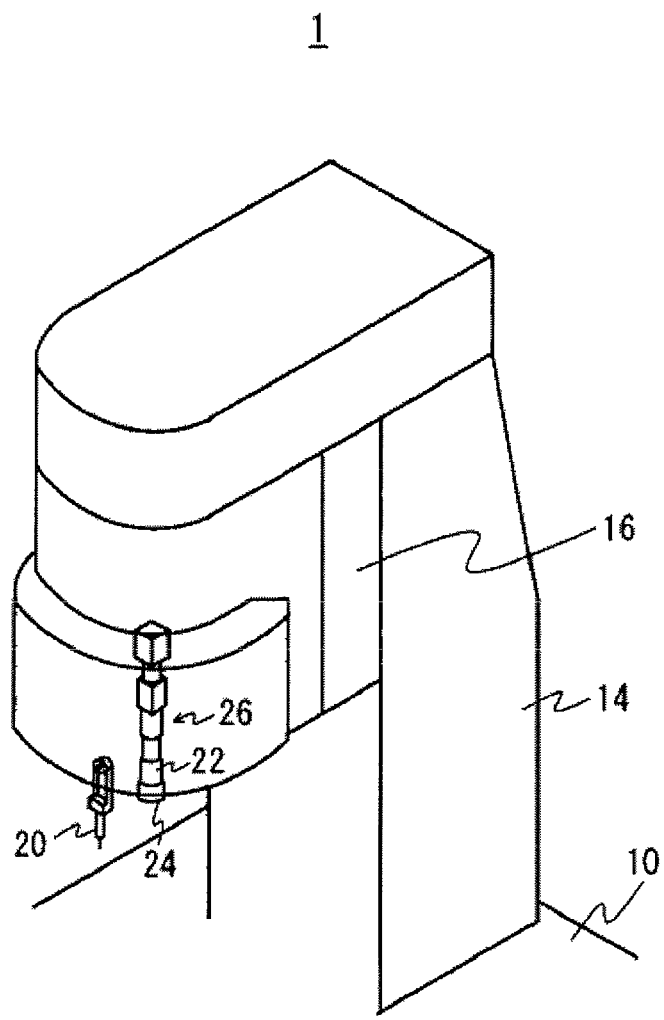
FIG. 3 is an explanatory diagram of a touch probe and a measurement sensor.

The Z slider 16 is capable of displacement in the Z axis direction, relative to the support column 14, using the Z axis displacement mechanism 34. As shown in FIG. 3, the touch probe 20, measurement sensor 22, and collision detection sensor 24 are mounted to the Z slider 16.

Figure 4:
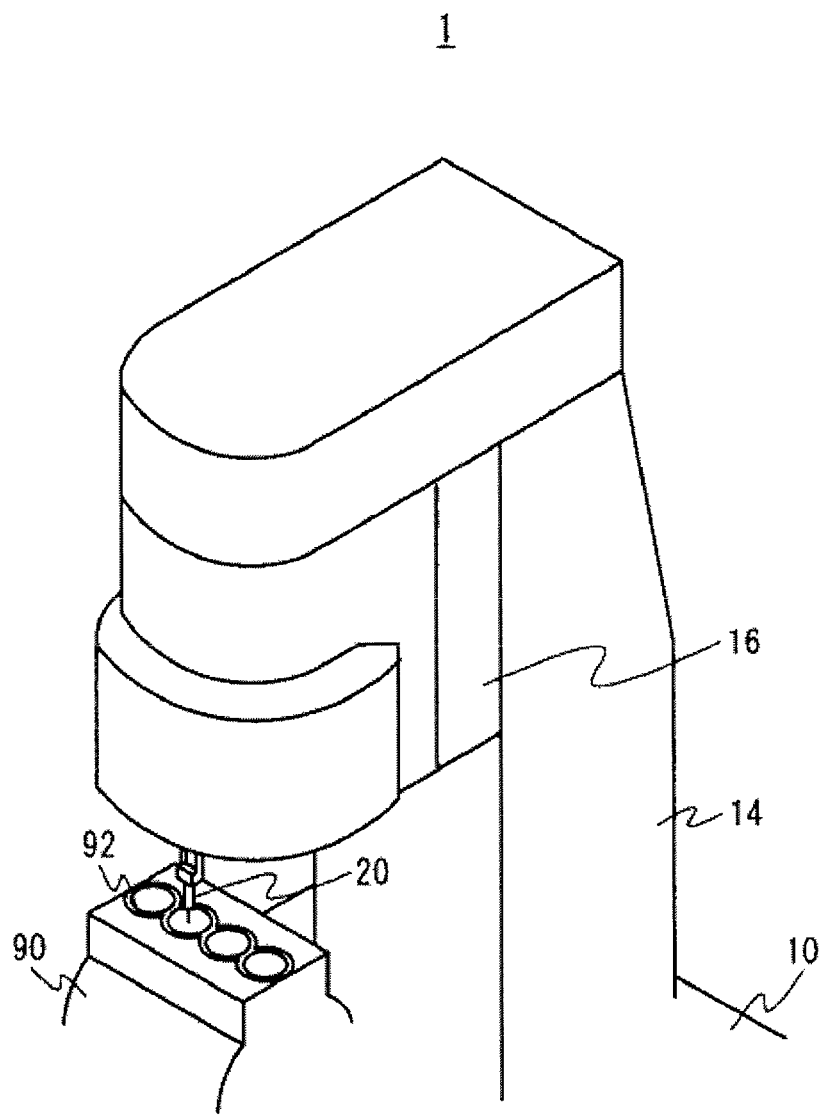
FIG. 4 illustrates a state where the touch probe is touching a measurable object.

FIG. 3 is an explanatory diagram of the touch probe 20 and the measurement sensor 22. FIG. 4 illustrates a state where the touch probe 20 is touching the measurable object 90. The touch probe 20 touches the measurable object 90 in order to measure coordinates of the measurable object 90. Because the touch probe 20 is mounted to the Z slider 16, the touch probe 20 displaces in the Z axis direction in conjunction with the displacement of the Z slider 16 in the Z axis direction. The Z slider 16 includes a displacement mechanism displacing the touch probe 20 upward and downward between a measurement position and a standby position in the Z axis direction.

In the measurement position of the touch probe 20, the touch probe 20 is positioned closer to the measurable object 90 than the measurement sensor 22 in the Z axis direction, in a position where the touch probe 20 can touch the measurable object 90. In the standby position of the touch probe 20, the touch probe 20 is in a position where the touch probe 20 is further from the measurable object 90 than the measurement sensor 22 in the Z axis direction. Normally, the touch probe 20 is in standby in the standby position and displaces to the measurement position when measuring the coordinates of the measurable object 90. Accordingly, while positioned in the measurement position, the touch probe 20 can be prevented from colliding with the measurable object 90 when the measurement sensor 22 measures the surface texture.

The measurement sensor 22 is a sensor measuring the surface texture of the interior wall 92 without contact. The measurement sensor 22 displaces in the Z axis direction in conjunction with the displacement of the Z slider 16 in the Z axis direction. The measurement sensor 22 measures a three-dimensional shape of the interior wall 92, for example, as the surface texture. Accordingly, unevenness of the interior wall 92 can be measured, and a volume of an indentation or a distribution of indentations can be measured, for example. As shown in FIG. 3, the measurement sensor 22 is mounted to a measurer 26 which extends downward from the Z slider 16 in the Z axis direction.

In the present embodiment, the measurement sensor 22 is an optical interference sensor measuring the surface texture of the interior wall 92 using data on brightness of interference fringes formed by optical interference. For example, it is known that in an optical interference sensor using a white light source, composite interference fringes formed by overlapping peaks of the interference fringes of various wavelengths increase in brightness at a focus position where an optical path length of a reference light path matches the optical path length of a measurement light path. Therefore, in the optical interference sensor, an interference image showing a two-dimensional distribution of interference optical intensity is captured by an image capture element such as a CCD camera while changing the length of the measurement light path, and the focus position where the intensity of interference light peaks is detected at various measurement positions in an image capture visual field. Accordingly, a height of a measured surface (specifically, the interior wall 92) at each measurement position is measured, and as a result a three-dimensional shape of the interior wall 92, for example, can be measured.

The optical interference sensor may for example use Michelson interferometry, which is well-known, and include a light source, lens, reference mirror, image capture element, and the like. In addition, in the present embodiment, light emitted from the light source positioned above the measurer 26 advances downward within the measurer 26, after which the optical axis of the light is bent 90° and the light is directed toward the interior wall 92 through an opening in a side surface of the measurer 26 facing the interior wall 92.

Referring back to FIG. 2, the collision detection sensor 24 detects a collision of the measurer 26 with the measurable object 90. The collision detection sensor 24 is provided to a tip of the measurer 26 below the Z slider 16. The collision detection sensor 24 projects in a radial direction of the cylindrical measurer 26 and is capable of touching the interior wall 92 before the measurement sensor 22 does. By detecting a collision using the collision detection sensor 24, it is possible to prevent the measurement sensor 22 from touching the interior wall 92, for example.

The X axis displacement mechanism 30 is a drive mechanism displacing the stage 12, on which the measurable object 90 rests, in the X axis direction (FIG. 1). The X axis displacement mechanism 30 is configured by a feed screw mechanism, for example, although those of skill in the art would understand that other suitable displacers may be used in alternative embodiments. The feed screw mechanism includes a ball screw shaft and a nut member threading onto the ball screw shaft. The X axis displacement mechanism 30 is not limited to a feed screw mechanism and may also be configured by a belt mechanism, for example, although those of skill in the art would understand that (like all disclosed displacement mechanisms/displacers) other suitable displacers may be used in alternative embodiments.

The Y axis displacement mechanism 32 is a drive mechanism displacing the stage 12 in the Y axis direction (FIG. 1). The Y axis displacement mechanism 32 is configured by a feed screw mechanism, for example, similar to the X axis displacement mechanism 30, although those of skill in the art would understand that other suitable displacers may be used in alternative embodiments. In the present embodiment, the X axis displacement mechanism 30 and the Y axis displacement mechanism 32 work together to displace the stage 12, on which the measurable object 90 rests, along an XY plane (first plane) where the X axis direction and Y axis direction are mutually orthogonal.

The Z axis displacement mechanism 34 is a drive mechanism displacing the Z slider 16 (measurer 26) in the Z axis direction (FIG. 1), which is orthogonal to the XY plane. The Z axis displacement mechanism 34 is configured by a feed screw mechanism, for example, although those of skill in the art would understand that other suitable displacers may be used in alternative embodiments. The Z axis displacement mechanism 34 brings the measurement sensor 22 opposite the interior wall 92 by lowering the measurer 26 in the Z axis direction.

Figure 5A:
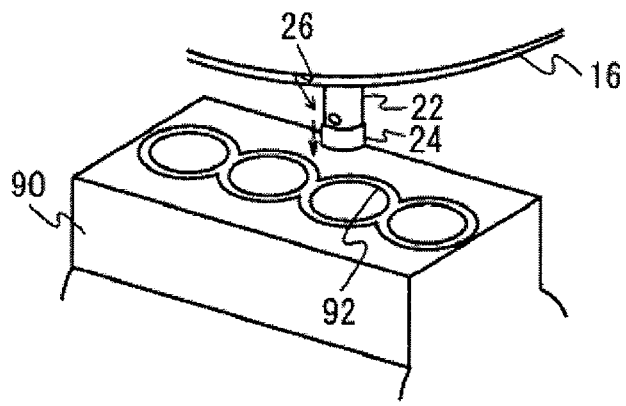
FIGS. 5A to 5C are explanatory diagrams illustrating displacement directions of a measurer.
Figure 5B:
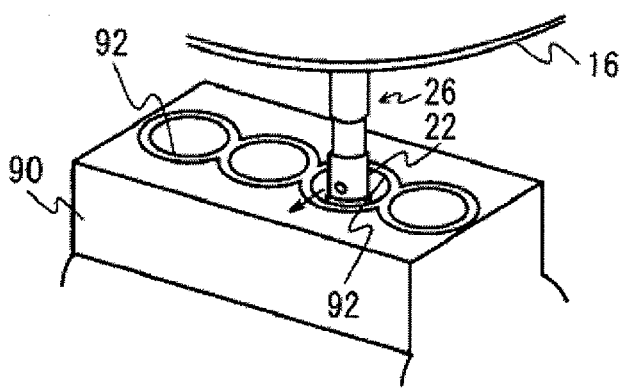
Figure 5C:
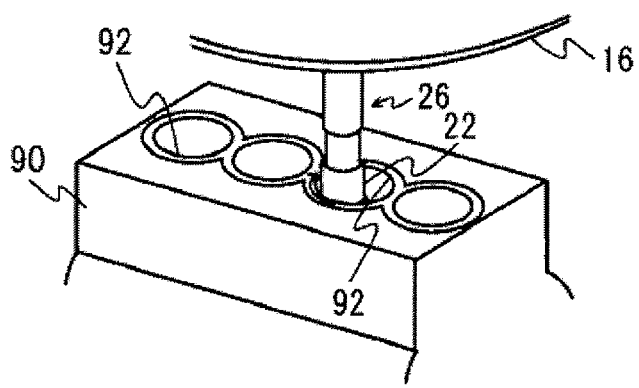

FIGS. 5A to 5C are explanatory diagrams illustrating displacement directions of the measurer 26. By lowering the measurer 26 in the direction of an arrow shown in FIG. 5A (specifically, by placing the measurement sensor 22 inside the cylinder portion), the Z axis displacement mechanism 34 brings the measurement sensor 22 opposite the interior wall 92, as shown in FIG. 5B. In the present embodiment, only the measurer 26 is positioned inside the cylinder portion. Therefore, even when the cylinder portion of the measurable object 90 has a small diameter, the surface texture of the interior wall 92 of the cylinder portion can be measured.

The W axis displacement mechanism 36 is a drive mechanism displacing the measurer 26 which faces the interior wall 92 (specifically, the measurement sensor 22) in the normal direction of the interior wall 92. In this example, the normal direction of the interior wall 92 is the same direction as the radial direction (hereafter called a W axis direction) of the cylinder portion of the measurable object 90. Therefore, the W axis displacement mechanism 36 displaces the measurement sensor 22 in the W axis direction. The W axis displacement mechanism 36 displaces the measurement sensor 22 from the center of the cylinder portion of the measurable object 90 toward the interior wall 92 (direction of an arrow shown in FIG. 5B), for example. Accordingly, the measurement sensor 22 approaches the interior wall 92 closely, as shown in FIG. 5C. Note that although the W axis direction includes the XY plane, the W axis direction intersects with the X axis direction and Y axis direction on the XY plane.

When the W axis displacement mechanism 36 displaces the measurement sensor 22 in the W axis direction, the measurement sensor 22 performs a scan in a predetermined scanning range (measurement range) in the W axis direction and measures the surface texture of the interior wall 92.

The θ axis displacement mechanism 38 is a drive mechanism displacing the measurer 26 which faces the interior wall 92 (specifically, the measurement sensor 22) along the interior wall 92. Specifically, the θ axis displacement mechanism 38 rotates the measurement sensor 22 in a θ axis direction (direction of an arrow shown in FIG. 5C), which is the circumferential direction of the cylinder portion of the measurable object 90 having a cylindrical interior wall (interior wall 92). Note that although the θ axis direction includes the XY plane, the θ axis direction intersects with the X axis direction and Y axis direction on the XY plane.

In the present embodiment, the interior wall 92 is divided into a plurality of measurement regions in the circumferential direction, and the measurement sensor 22 measures the surface texture of each measurement region. Accordingly, by displacing in the θ axis direction (circumferential direction) using the θ axis displacement mechanism 38, the measurement sensor 22 can measure the surface texture of each measurement region.

Figure 6:
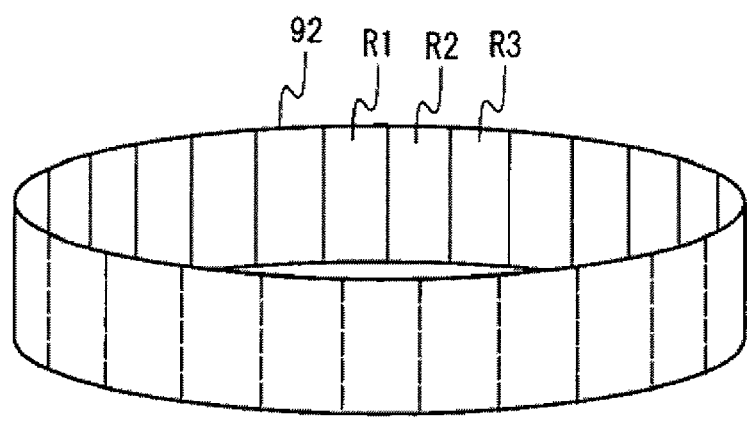
FIG. 6 is an explanatory diagram of a plurality of measurement regions lying along a circumferential direction of an interior wall surface.

FIG. 6 is an explanatory diagram of a plurality of measurement regions lying along the circumferential direction of the interior wall 92. The measurement regions (measurement regions R1, R2, R3, and the like shown in FIG. 6) are rectangular sections of the interior wall 92. A size of the measurement region may be defined in accordance with a size of a field of view that the image capture element of the measurement sensor 22 is capable of capturing, for example.

Figure 7A:
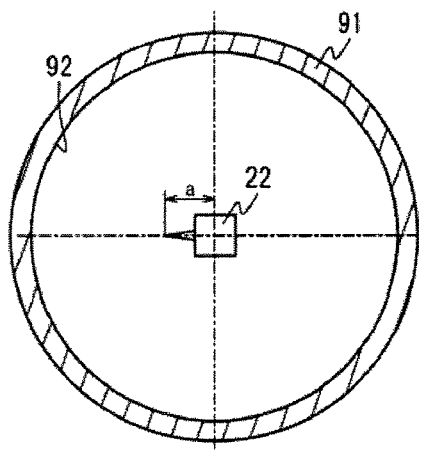
FIGS. 7A to 7D are explanatory diagrams illustrating how the measurement sensor displaces during measurement.

FIGS. 7A to 7D are explanatory diagrams illustrating how the measurement sensor 22 displaces during measurement. In this example, as shown in FIG. 7A, the measurement sensor 22, which performs measurement at a focus distance a, is treated as being positioned at the center of the cylinder portion 91. The focus distance a is a distance from the center of the measurement sensor 22 to the focus position.

Figure 7B:
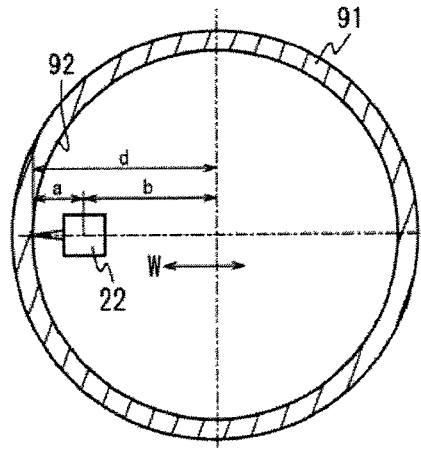

First, the measurement sensor 22 is displaced by the W axis displacement mechanism 36 in the W axis direction toward the interior wall 92 and is positioned at a measurement reference position shown in FIG. 7B. In this example, the measurement reference position is a position where the focus position of the measurement sensor 22 is the interior wall 92. Therefore, the W axis displacement mechanism 36 displaces the measurement sensor 22 by a distance b (obtained by subtracting the focus distance a from a diameter d of the cylinder portion 91).

Figure 7C:
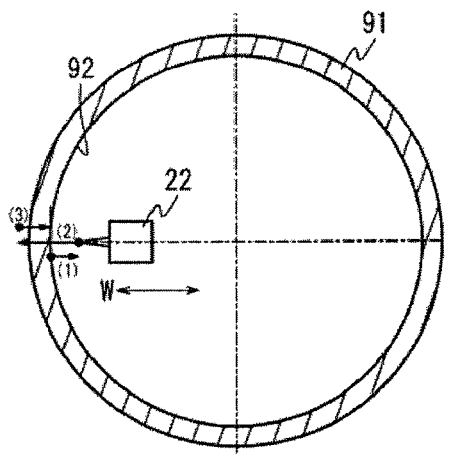

Next, the measurement sensor 22 is displaced in the W axis direction from the measurement reference position to a scan start position (in a direction shown by an arrow (1) in FIG. 7C. The measurement sensor 22 then displaces in a direction shown by an arrow (2) from the scan start position until reaching a scan end position to perform the scan of the interior wall 92. Thus, the range from the scan start position to the scan end position in the W axis direction is a scan range. After this, the measurement sensor 22 is displaced from the scan end position to the measurement reference position, as shown by an arrow (3). This ends measurement of a first field of view (measurement region R1 in FIG. 6, for example).

Figure 7D:
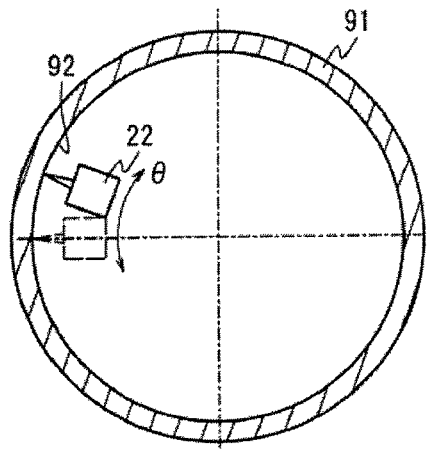

Next, in order to measure a second field of view (measurement region R2), the measurement sensor 22 is rotated in the θ axis direction by the θ axis displacement mechanism 38. FIG. 7D shows the measurement sensor 22 positioned at the measurement reference position of the second field of view. The measurement sensor 22 scans the interior wall 92 in the second field of view while displacing as it did in the first field of view. A third field of view onward is similar, and thus a detailed description thereof is omitted.

Returning to FIG. 2, the control device 70 controls overall operations of the surface texture measuring apparatus 1. The control device 70 includes a memory 72 and a controller 74. The memory 72 includes, for example, a ROM (Read Only Memory) and RAM (Random Access Memory). The memory 72 stores programs executed by the controller 74 and various kinds of data. For example, the memory 72 stores measurement results of the interior wall 92 obtained by the measurement sensor 22 and analysis results of the surface texture of the interior wall 92 based on the measurement results.

The controller 74 is a CPU (Central Processing Unit), for example. The controller 74 controls operations of the surface texture measuring apparatus 1 by executing a program stored in the memory 72. For example, the controller 74 drives the X axis displacement mechanism 30, the Y axis displacement mechanism 32, the Z axis displacement mechanism 34, the W axis displacement mechanism 36, and the θ axis displacement mechanism 38, thereby enabling automatic measurement of the interior wall 92 of the four cylinders of the cylinder head (measurable object 90). In addition, the controller 74 analyzes the surface texture of the interior wall 92 based on the measurement results.

Figure 8A:
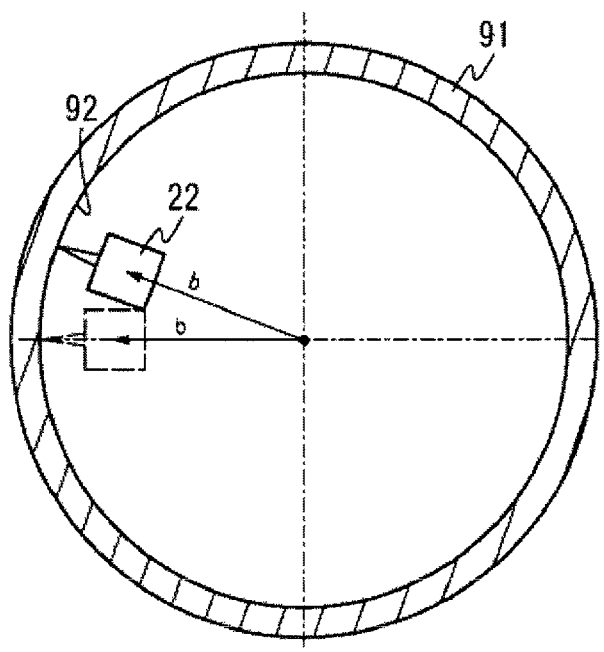
FIGS. 8A and 8B are explanatory diagrams illustrating an issue arising when a cylinder portion is not a perfect circle.
Figure 8B:
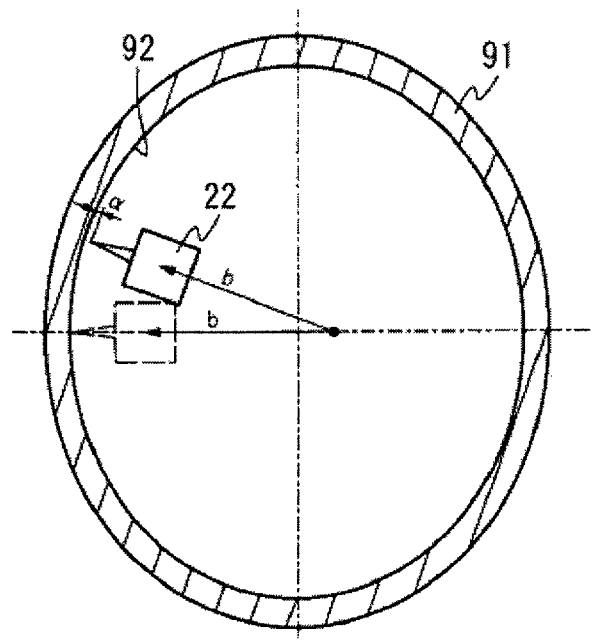

FIGS. 8A and 8B are explanatory diagrams illustrating an issue arising when the cylinder portion 91 is not a perfect circle. As noted above, the measurement sensor 22 scans the measurement region in each field of view by rotating in the θ axis direction. In this example, in a case where the cylinder portion 91 is a perfect circle, the measurement sensor 22 can appropriately scan the measurement regions in both the first and second fields of view in the normal direction at the same position (a position the distance b from the center), as shown in FIG. 8A. Meanwhile, in a case where the cylinder portion 91 is not a perfect circle, a measurement error of the measurement sensor 22 may arise when a center of θ axis direction rotation of the measurement sensor 22 does not match the center of the cylinder portion 91, as shown in FIG. 8B. For example, even when the measurement sensor 22 is positioned at the measurement reference position, the focus position of the measurement sensor 22 may in fact be offset from the interior wall 92 by a distance a. In particular, when the distance a becomes large, the measurement region may no longer fit into the scan range of the measurement sensor 22 and surface texture measurement may be impossible.

Given this, in the present embodiment, the controller 74 controls adjustment of the measurement position of the measurement sensor 22 so as to enable highly accurate measurement of the detailed surface texture of the interior wall 92 even when the cylinder portion 91 is not a perfect circle.

Controlling Adjustment of Measurement Position

Controlling adjustment of the measurement position of the measurement sensor 22 is a control in which, when measuring the surface texture of the interior wall 92 in a plurality of fields of view, the W axis direction measurement position for measuring a subsequent field of view is adjusted based on the measurement results of a previous field of view. Hereafter, a detailed description of controlling the adjustment of the measurement position is given with reference to FIGS. 9A to 11.

Figure 9A:
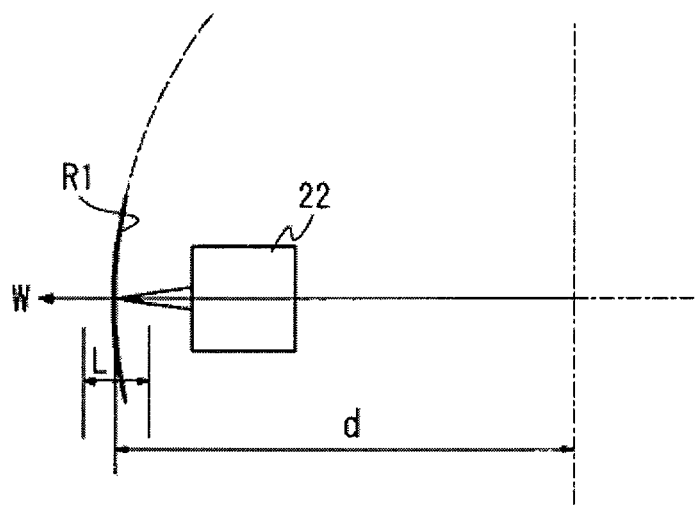
FIGS. 9A and 9B are explanatory diagrams illustrating measurement of a first field of view.
Figure 9B:
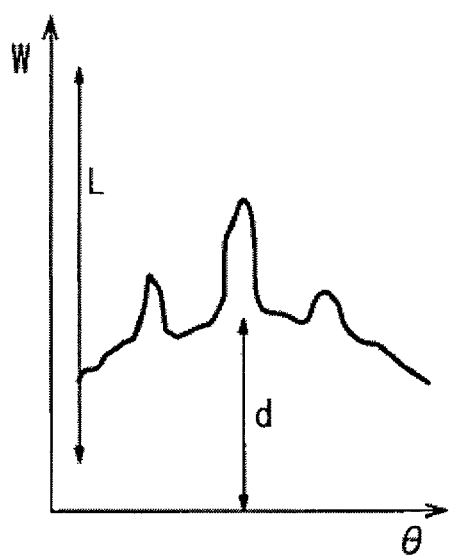

FIGS. 9A and 9B are explanatory diagrams illustrating measurement of the first field of view. FIG. 9A shows the measurement reference position of the measurement sensor 22 for the first field of view, and FIG. 9B shows the measurement results for the first field of view. In this example, in the first field of view, the three-dimensional shape of the measurement region R1 of the interior wall 92 is measured in a scan range L. In the first field of view, the measurement sensor 22 displaces as described by FIG. 7C and performs three-dimensional shape measurement of the measurement region R1. As a result, measurement results as shown in FIG. 9B are obtained, which are capable of defining a detailed three-dimensional shape.

Figure 10A:
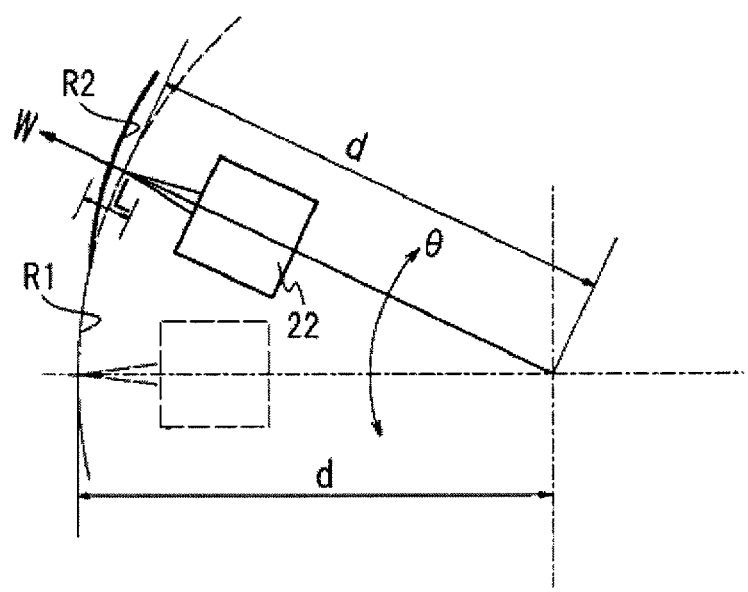
FIGS. 10A and 10B are explanatory diagrams illustrating measurement of a second field of view.
Figure 10B:
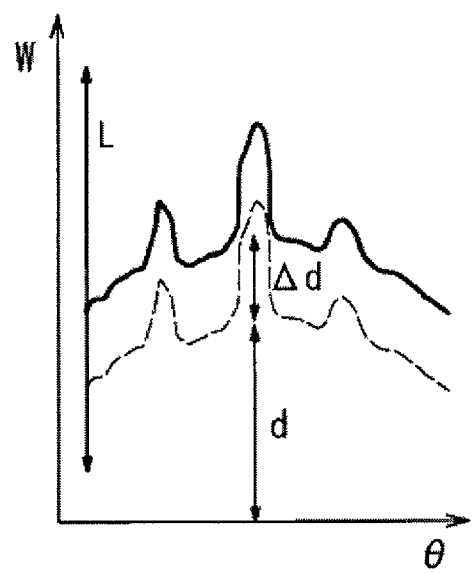

FIGS. 10A and 10B are explanatory diagrams illustrating measurement of the second field of view. FIG. 10A shows the measurement reference position of the measurement sensor 22 for the second field of view, and FIG. 10B shows the measurement results for the second field of view. In this example, in the second field of view, the three-dimensional shape of the measurement region R2, which is adjacent to the measurement region R1 in the θ axis direction, is measured in the scan range L. When measuring the second field of view, the controller 74 adjusts the position of the measurement range (scan range L) of the measurement sensor 22 in the W axis direction for measuring the surface texture of the measurement region R2, based on the measurement results of the surface shape (here, the three-dimensional shape) of the measurement region R1.

Specifically, based on the measurement results of the three-dimensional texture of the measurement region R1, the controller 74 obtains an estimated distance (estimated distance d in FIG. 9B) in the W axis direction between the measurement region R1 and the θ axis direction center of rotation. In addition, the controller 74 adjusts the position of the scan range L in the W axis direction for measuring the surface texture of the measurement region R2, based on the estimated distance d obtained. Specifically, the controller 74 displaces the measurement sensor 22 such that the focus position of the measurement sensor 22 is positioned the estimated distance d away in the W axis direction from the center of rotation, as shown in FIG. 10A.

The estimated distance d is found as an average value or median value of the overall measured values shown in FIG. 9B, for example. "Median value" refers to a midrange value between the largest and smallest measured values. By using one of the average value and median value, the estimated distance d can be found with a high degree of accuracy. Also, the estimated distance d is not necessarily found from the overall measured values and may instead be found from the measured values of a partial region of the measurement region R1, for example. In other words, the estimated distance d may also be found from the average value or median value of the measurement results of at least a partial region of the measurement region R1.

In the present embodiment, the cylinder portion 91 is not a perfect circle and the measurement region R2 is further from the center of the cylinder portion 91 than the measurement region R1. In such a case, as shown in FIG. 10B, a graph of the measurement results is offset by Δd in FIG. 10B. When the cylinder portion 91 is not a perfect circle, there is an elevated potential that measurement region R3 on will be located in a different position in the normal direction than measurement region R1. Given this, the controller 74 adjusts the W axis direction measurement position when measuring the surface texture of the measurement region R3 based on the measurement results of the surface texture (here, the three-dimensional shape) of the measurement region R2.

Figure 11:
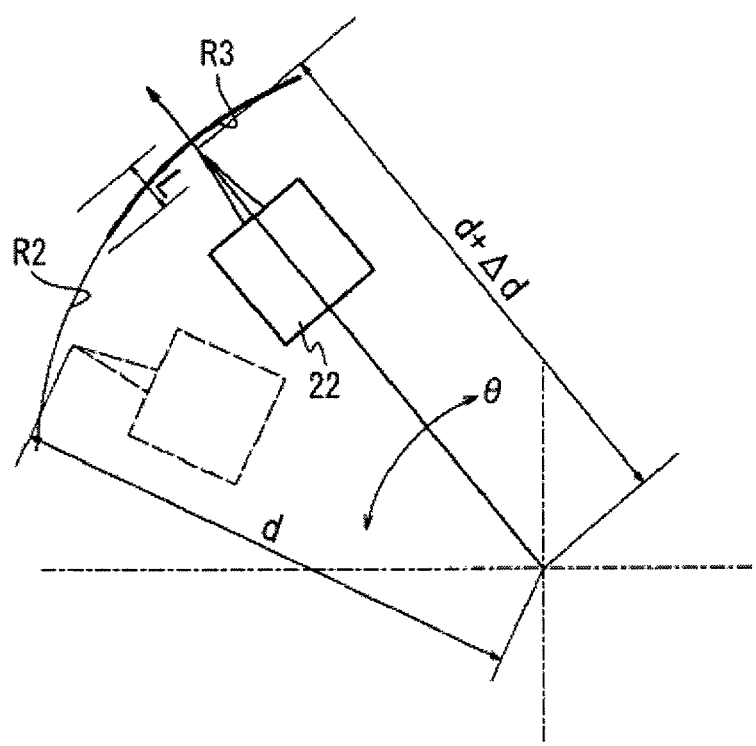
FIG. 11 is an explanatory diagram illustrating adjustment of a measurement position of the measurement sensor in a third field of view.

FIG. 11 is an explanatory diagram illustrating adjustment of the measurement position of the measurement sensor 22 in the third field of view. Based on the measurement results of the measurement region R2, the controller 74 obtains an estimated distance (estimated distance (d+Δd) in FIG. 10B) between the measurement region R2 and the θ axis direction center of rotation. In addition, in the third field of view, the controller 74 drives the W axis displacement mechanism 36 and the θ axis displacement mechanism 38 to displace the measurement sensor 22 in the W axis direction such that the focus position of the measurement sensor 22 is positioned the estimated distance (d+Δd) away from the center of rotation, as shown in FIG. 11. Accordingly, W axis direction offset between the focus position of the measurement sensor 22 and the interior wall 92 (the distance a shown in FIG. 8B) can be constrained. As a result, the measurement region R3 can be prevented from diverging from the scan range L, and the three-dimensional shape of the measurement region R3 can be measured with a high degree of accuracy. In this example, adjustment of the measurement position of the measurement sensor 22 is performed by driving the W axis displacement mechanism 36 and the θ axis displacement mechanism 38. However, the present invention is not limited to this. Adjustment of the measurement position may also be performed while additionally displacing the stage 12 by driving the X axis displacement mechanism 30 and the Y axis displacement mechanism 32.

Method of Measuring Surface Texture of Interior Wall

A description is now given of a method of measuring the surface texture of the interior wall 92 using the surface texture measuring apparatus 1 described above. Measurement of the surface texture of the interior wall 92 is performed by the controller 74 of the control device 70 executing a program stored in the memory 72.

In this example, as shown in FIG. 1, the measurable object 90 is placed on the stage 12. First, the controller 74 drives the X axis displacement mechanism 30 and the Y axis displacement mechanism 32 and displaces the stage 12 in the X axis direction and the Y axis direction to position the measurable object 90 below the Z slider 16 (see FIG. 4).

Next, the controller 74 displaces the touch probe 20 from the standby position to the measurement position to touch the measurable object 90 (cylinder block) and thereby measures, for example, a top surface height of the cylinder block, a center position and diameter of the cylinder, and the like. When measurement ends, the controller 74 displaces the touch probe 20 to the standby position.

Next, the controller 74 drives the X axis displacement mechanism 30 and the Y axis displacement mechanism 32 and, based on the measurement results of the touch probe 20, displaces the measurer 26 to the center of the cylinder (FIG. 5A). Next, the controller 74 drives the Z axis displacement mechanism 34 and lowers the measurer 26 into the cylinder (FIG. 5B).

Next, the controller 74 drives the W axis displacement mechanism 36 and displaces the measurer 26 in the W axis direction (FIG. 5C). When the measurer 26 displaces in the W axis direction, the measurement sensor 22 of the measurer 26 scans a first measurement region of the interior wall 92 of the measurable object 90. When the scan of the first measurement region ends, the controller 74 drives the θ axis displacement mechanism 38 and rotates the measurer 26 in the θ axis direction. Then the controller 74 displaces the measurer 26 in the W axis direction and scans the measurement region adjacent to the first measurement region on the interior wall 92. At this point, the controller 74 performs the measurement position adjustment control described above to adjust the position of the measurement sensor 22 and scans the measurement region. In this way, the entire interior wall 92 is scanned by repeating the W axis direction and θ axis direction displacement of the measurer 26.

Next, the controller 74 analyzes the surface texture of the interior wall 92 based on the measurement results of each measurement region of the interior wall 92. The controller 74 analyzes a detailed three-dimensional shape of the interior wall 92, for example, as the surface texture.

Benefits of the Present Embodiment

When measuring, with the measurement sensor 22, the surface texture of the plurality of measurement regions into which the interior wall 92 of the cylinder portion 91 is divided in the circumferential direction, the surface texture measuring apparatus 1 according to the above-described embodiment adjusts the measurement position (position of the scan range L) of the measurement sensor 22 in the W axis direction when measuring the surface texture of the subsequent measurement region, based on the measurement results of the surface texture of the previous measurement region. Accordingly, when the cylinder portion 91 is not a perfect circle, the position of the scan range L of the measurement sensor 22 in the W axis direction is adjusted, and offset between the focus position of the measurement sensor 22 and the measurement region in the W axis direction can be constrained. As a result, the measurement regions can be prevented from diverging from the scan range L in the W axis direction, and therefore a detailed surface texture of the interior wall 92 can be measured with a high degree of accuracy.

In the above description, the measurement sensor 22 is an optical interference sensor measuring the surface texture of the interior wall 92 using optical interference measurement. However, the present invention is not limited to this. For example, the measurement sensor 22 may be an image sensor measuring the surface texture of the interior wall 92 by capturing an image of the interior wall 92. In such a case, when measurement is performed with an image sensor having a simple configuration, a detailed surface texture of the interior wall 92 can be measured with a high degree of accuracy by performing the measurement position adjustment control described above.

In addition, the measurement sensor 22 may be a confocal sensor measuring the surface texture of the interior wall 92 by focusing light on the interior wall 92. Moreover, the measurement sensor 22 may be a sensor (referred to as a contrast sensor for ease of description) measuring the surface texture of the interior wall 92 by detecting a peak in contrast of a captured image of the interior wall 92. When measurement is performed using the confocal sensor or contrast sensor as the measurement sensor 22, a detailed three-dimensional shape of the interior wall 92 can be measured with a high degree of accuracy by performing the measurement position adjustment control described above.

In the above, the measurable object 90 is a cylinder head of an engine. However, the measurable object 90 is not limited to this. The measurable object 90 may instead be a honing pipe, for example. In other words, the measurable object 90 may be any object having a cylinder portion.

The present invention is described above by way of an embodiment, but the technical scope of the present invention is not limited to that described in the embodiment above. It is clear to one skilled in the art that many modifications or improvements might be added to the embodiment above. The scope of the claims makes clear that the addition of such modifications and improvements is also included in the technical scope of the present invention.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A surface texture measuring apparatus comprising:
a measurement sensor configured to measure, without contact, a surface texture of an interior wall of a cylinder portion of a measurable object, while displacing in a normal direction of the interior wall at each measurement region into which the interior wall is divided in the circumferential direction of the cylinder portion;
a normal direction displacer configured to displace, in the normal direction, the measurement sensor such that the measurement sensor measures the surface texture of a first measurement region;
a circumferential direction displacer configured to displace the measurement sensor in the circumferential direction, after measurement of the surface texture of the first measurement region, such that the measurement sensor faces a second measurement region adjacent to the first measurement region in the circumferential direction; and
a controller configured to adjust a normal direction measurement position for measuring the surface texture of the second measurement region while displacing the measurement sensor in the normal direction, the controller further configured to adjust the measurement position based on measurement results of the surface texture of the first measurement region.

2. The surface texture measuring apparatus according to claim 1, wherein:
the measurement sensor is further configured to measure the surface texture in a predetermined measurement range in the normal direction, and
the controller is further configured to adjust a normal direction position of the measurement range for measuring the surface texture of the second measurement region based on the measurement results of the surface texture of the first measurement region.

3. The surface texture measuring apparatus according to claim 1, wherein the controller is further configured to:
find an estimated distance in the normal direction between a center of rotation of the measurement sensor in the circumferential direction and the first measurement region based on the measurement results of the surface texture of the first measurement region, and
adjust a normal direction measurement position for measuring the surface texture of the second measurement region based on the estimated distance.

4. The surface texture measuring apparatus according to claim 3, wherein:
   the measurement sensor is further configured to measure a three-dimensional shape as the surface texture of the first measurement region, and
   the controller is further configured to find the estimated distance based on the three-dimensional shape of the first measurement region.

5. The surface texture measuring apparatus according to claim 3, wherein the controller is further configured to find the estimated distance based on one of an average value and a median value of measured values for at least a partial region of the first measurement region.

6. The surface texture measuring apparatus according to claim 1, further comprising:
   an intersecting direction displacer configured to displace the measurable object in a first plane that includes the normal direction and the circumferential direction, in an intersecting direction intersecting with the normal direction and the circumferential direction; and
   an orthogonal direction displacer configured to move the measurement sensor opposite the interior wall by displacing the measurement sensor in an orthogonal direction orthogonal to the first plane.

7. The surface texture measuring apparatus according to claim 1, wherein the measurement sensor is an optical interference sensor configured to measure the surface texture using data on brightness of interference fringes formed by optical interference.

8. The surface texture measuring apparatus according to claim 1, wherein the measurement sensor is an image sensor configured to measure the surface texture by capturing an image of the interior wall.

9. The surface texture measuring apparatus according to claim 1, wherein the measurement sensor is a confocal sensor configured to measure the surface texture by focusing light on the interior wall.

10. The surface texture measuring apparatus according to claim 1, wherein the measurement sensor is a sensor configured to measure the surface texture by detecting a peak in contrast of a captured image of the interior wall.

11. A surface texture measuring method comprising:
    measuring, without contact, a surface texture of a first measurement region from among a plurality of measurement regions divided in a circumferential direction of a cylinder portion of a measurable object while displacing a measurement sensor in a normal direction of an interior wall of the cylinder portion;
    displacing the measurement sensor in the circumferential direction, after measurement of the surface texture of the first measurement region, such that the measurement sensor faces a second measurement region adjacent to the first measurement region in the circumferential direction; and
    adjusting a normal direction measurement position for measuring the surface texture of the second measurement region while displacing the measurement sensor in the normal direction, the adjustment of the measurement position being based on measurement results of the surface texture of the first measurement region.

* * * * *